(12) United States Patent
Lukyanov et al.

(10) Patent No.: US 8,301,428 B2
(45) Date of Patent: Oct. 30, 2012

(54) MODELING THE NONLINEAR HYSTERESIS RESPONSE OF RESERVOIR MEDIA

(75) Inventors: Alexander Lukyanov, Abingdon (GB); Ali Fadili, Abingdon (GB); David Browning, Dorking (GB); Mark Wakefield, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 729 days.

(21) Appl. No.: 12/491,316

(22) Filed: Jun. 25, 2009

(65) Prior Publication Data

US 2010/0004914 A1   Jan. 7, 2010

Related U.S. Application Data

(60) Provisional application No. 61/077,440, filed on Jul. 1, 2008.

(51) Int. Cl.
*G06G 7/48* (2006.01)
*G06G 7/50* (2006.01)
(52) U.S. Cl. .............................. 703/10; 703/9
(58) Field of Classification Search .................... 703/10, 703/9
See application file for complete search history.

(56) References Cited

U.S. PATENT DOCUMENTS

| | | | |
|---|---|---|---|
| 7,451,066 B2 * | 11/2008 | Edwards et al. ................ | 703/2 |
| 2005/0015231 A1 * | 1/2005 | Edwards et al. ................ | 703/10 |
| 2006/0015310 A1 * | 1/2006 | Husen et al. ................... | 703/10 |

OTHER PUBLICATIONS

Hifler, "Macroscopic capillarity without a constitutive capillary pressure function"; Physica A, 371, 2006, pp. 209-225.
Hodgdon, M.L. [1988] Application of a Theory of Ferromagnetic Hysteresis. IEEE Transactions on Magnetics, 24 (1), 218-221.
Hodgdon, M.L. [1988] Mathematical Theory and Calculations of Magnetic Hysteresis Curves. IEEE Transactions on Magnetics, 24 (6), 3120-3122.
Killough, J. E. [1976] Reservoir simulation with History-dependent Saturation Functions, Trans. AIME 261, 37-48.
Kleppe, J., Delaplace, P., Lenormand, R., Hamon, G., Chaput, E. [1997] Representation of Capillary Pressure Hysteresis in Reservoir Simulation, Soc. Pet. Eng. J., 597-604.
Kossack, C. A. [2000] Comparison of Reservor Simulation Hysteresis Options, Soc. Pet. Eng. J., 1-10.
McCall, K.R., Guyer, R.A. [1996] A New theoretical paradigm to describe hysteresis, discrete memory and nonlinear elastic wave propagation in rock. Nonlinear Processes in Geophysics, 3, 89-101.

\* cited by examiner

*Primary Examiner* — Mary C Jacob
*Assistant Examiner* — Aniss Chad
(74) *Attorney, Agent, or Firm* — Colin L. Wier

(57) ABSTRACT

A method of modeling a nonlinear hysteresis response of reservoir media involves obtaining measurements of core samples from the reservoir to generate a multitude of bounding curves representing primary drainage and primary imbibition characteristics of a reservoir, generating, using a processor, a plurality of constitutive equations based on the multitude of bounding curves and a multitude of material functions, the multitude of material functions determined based on material properties associated with the reservoir, generating, using the processor, an output in a form of capillary-pressure scanning curves based on the multitude of constitutive equations, the capillary-pressure scanning curves representing drainage and imbibition behaviors of the reservoir during an oilfield operation, and storing the output.

17 Claims, 6 Drawing Sheets

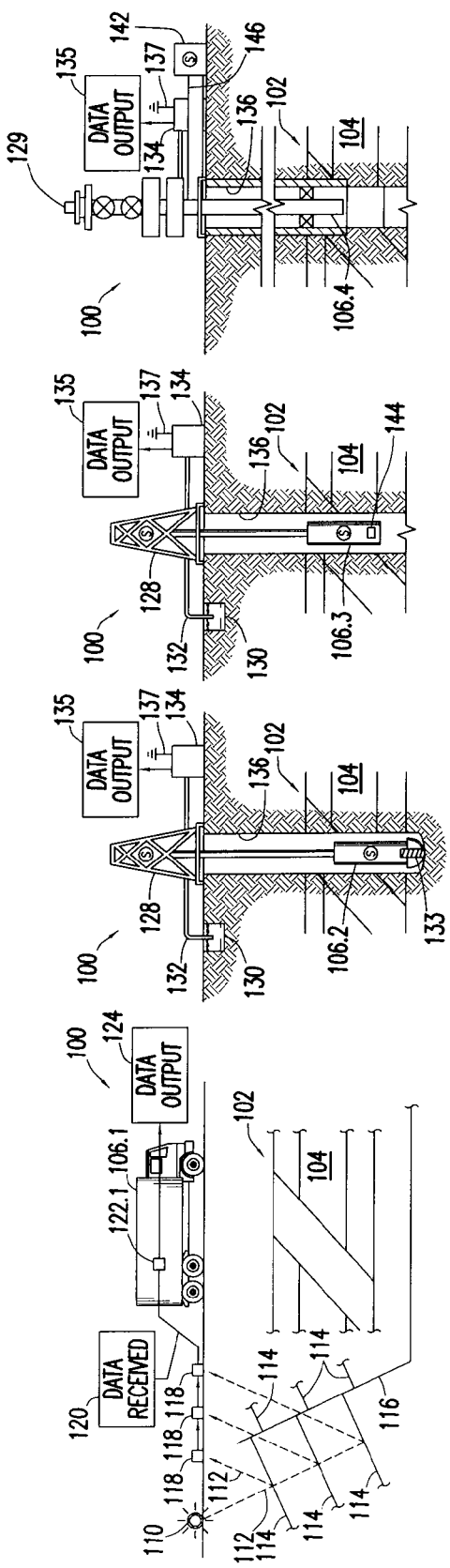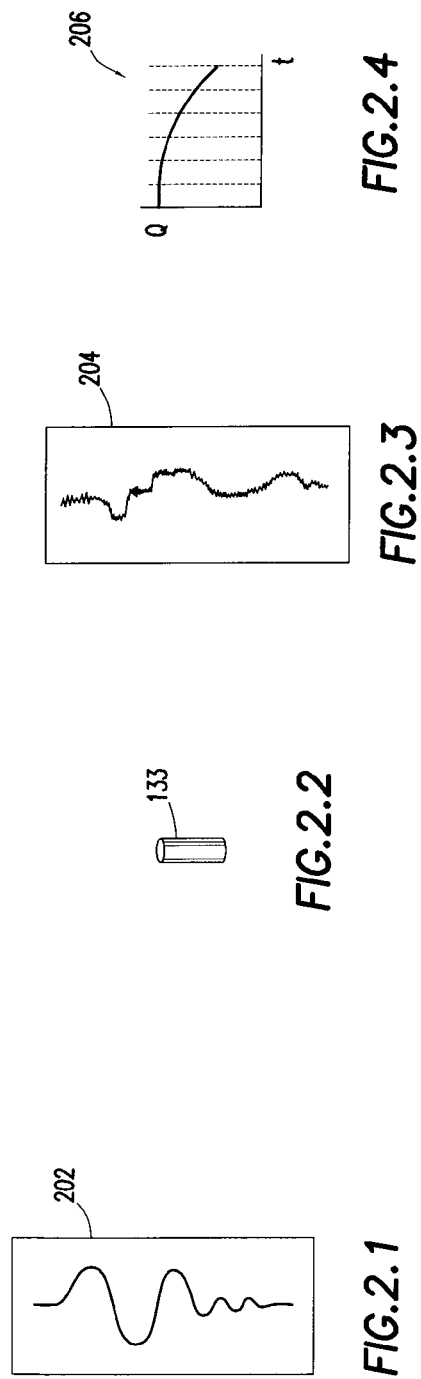

US 8,301,428 B2

MODELING THE NONLINEAR HYSTERESIS RESPONSE OF RESERVOIR MEDIA

CROSS-REFERENCE TO RELATED APPLICATIONS

This Application claims priority under 35 U.S.C. §119(e) to Provisional Patent Application No. 61/077,440, filed Jul. 1, 2008, entitled "GENERALIZED APPROACH FOR MODELING THE NONLINEAR HYSTERESIS RESPONSE OF RESERVOIR MEDIA," which is incorporated herein by reference in its entirety.

BACKGROUND

One of the fundamental reasons for the hysteretic nonlinear behavior of porous reservoir media is that heterogeneous or damaged materials contain an enormous number of mesoscopic features such as microcracks and macrocracks, joints, and grain to grain contacts containing multiphase liquids. Each of these mesoscopic units exhibits a hysteretic behavior which dominates the macroscopic reservoir response. Fluids in the reservoir may significantly influence the quasistatic and dynamic response in porous materials of the reservoir media due to the activation of internal molecular forces. Hysteresis can affect oil recovery efficiency because of the induced relative permeability reduction and the associated trapping of oil.

SUMMARY

In general, aspects of the invention are directed to a method of modeling a nonlinear hysteresis response of reservoir media involves obtaining measurements of core samples from the reservoir to generate a multitude of bounding curves representing primary drainage and primary imbibition characteristics of a reservoir generating using a processor a plurality of constitutive equations based on the multitude of bounding curves and a multitude of material functions, the multitude of material functions determined based on material properties associated with the reservoir, generating, using the processor, an output in a form of capillary-pressure scanning curves based on the multitude of constitutive equations, the capillary-pressure scanning curves representing drainage and imbibition behaviors of the reservoir during an oilfield operation, and storing the output.

Other aspects of modeling the nonlinear hysteresis response of reservoir media will be apparent from the following description and the appended claims.

BRIEF DESCRIPTION OF THE DRAWINGS

So that the above recited features of modeling a nonlinear hysteresis response of reservoir media can be understood in detail, a more particular description, briefly summarized above, may be had by reference to the embodiments thereof that are illustrated in the appended drawings. It is to be noted, however, that the appended drawings illustrate typical embodiments of and are therefore not to be considered limiting of its scope, for modeling a nonlinear hysteresis response of reservoir media may admit to other equally effective embodiments.

FIGS. 1.1-1.4 depict a schematic view of an oilfield having subterranean structures containing reservoirs therein, in which embodiments of modeling a nonlinear hysteresis response of reservoir media can be implemented.

FIGS. 2.1-2.4 depict graphical depictions of data collected by the tools of FIGS. 1.1-1.4, respectively.

DETAILED DESCRIPTION

Figure 3:
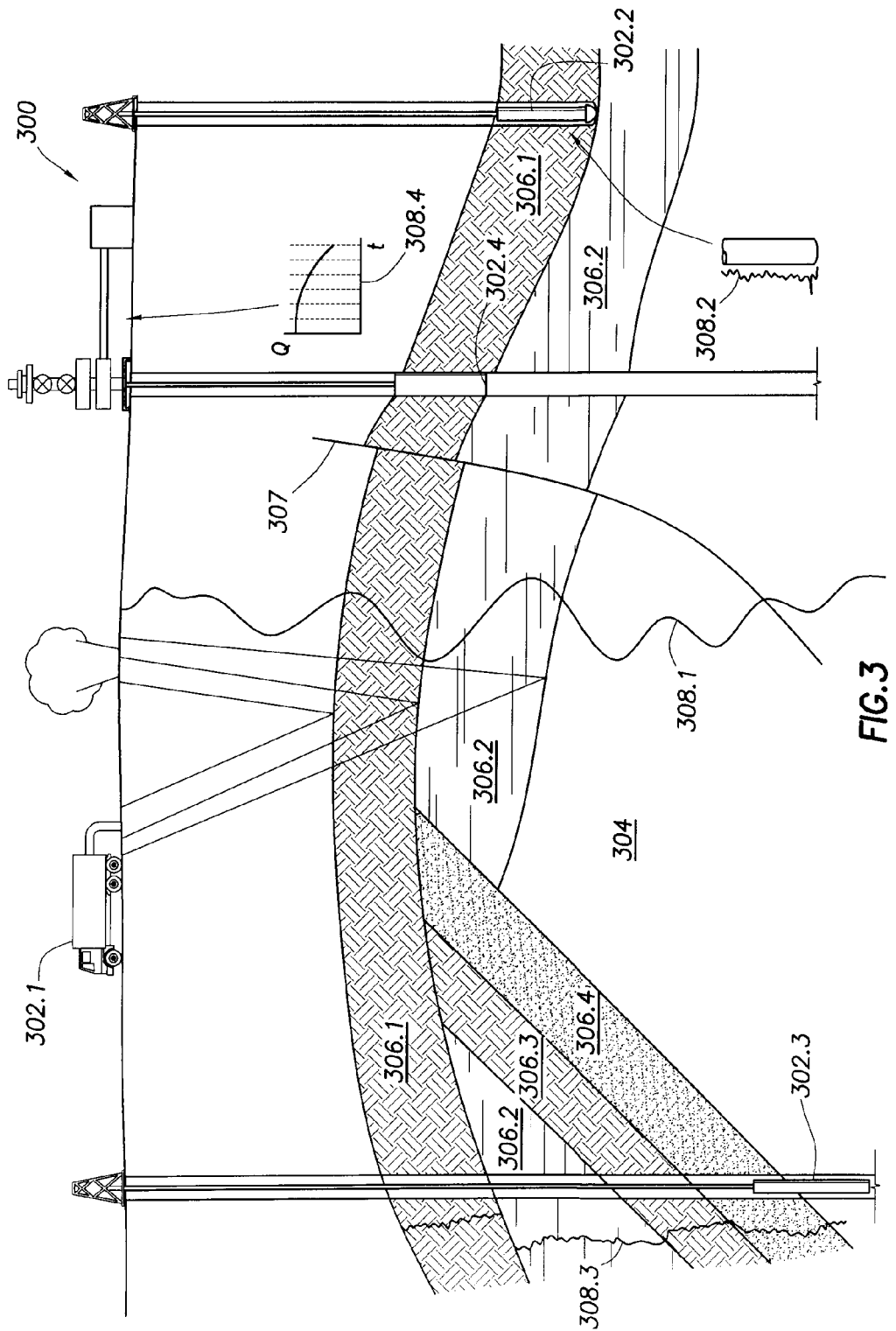
FIG. 3 depicts a schematic view, partially in cross section of an oilfield having a plurality of data acquisition tools positioned at various locations along the oilfield for collecting data from the subterranean formations.

Embodiments of modeling a nonlinear hysteresis response of reservoir media are shown in the above-identified figures and described in detail below. In describing the embodiments, like or identical reference numerals are used to identify common or similar elements. The figures are not necessarily to scale and certain features and certain views of the figures may be shown exaggerated in scale or in schematic in the interest of clarity and conciseness.

In general, modeling a nonlinear hysteresis response of reservoir media uses a set of constitutive equations based on measured bounding curves to model hysteresis behaviors in material properties such as capillary pressure and relative permeability. In particular, the constitutive equations may be configured based on material specific functions (referred to as material functions) to match laboratory measurements (e.g., of core samples from the reservoir) such that the modeling accuracy can be fine-tuned.

FIGS. 1.1-1.4 show a schematic view of an oilfield having subterranean structures containing reservoirs therein, with various oilfield operations being performed on the oilfield.

FIG. 1.1 depicts a survey operation being performed to generate a seismic data output record (124) using recording truck computer (122.1) on a seismic recording truck (106.1) to receive, via geophone-receivers (118), data (120) of sound vibration(s) (112) that reflect off horizons (114) in an earth formation (116) from an acoustic source (110).

FIG. 1.2 depicts a drilling operation being performed by a drilling tool (106.2) suspended by a rig (128) and advanced into the subterranean formation (102) to form a wellbore (136) for reaching the reservoir (104). Drilling mud is circulated through the drilling tool (106.2) via a flow line (132) back to a mud pit (130) on the surface. The drilling tool may be adapted for measuring downhole properties such as adapted for taking a core sample (133). A surface unit (134) with a transceiver (137) collects data output (135) generated during the drilling operation and allows communications between various portions of the oilfield (100) or other locations.

FIG. 1.3 depicts a wireline operation and includes all the elements depicted in FIG. 1.2 except that the drilling tool (106.2) is substituted with a wireline tool (106.3) adapted for performing well logs, downhole tests, collecting samples, and/or performing a seismic survey operation based on an explosive or acoustic energy source (144) in which case the wireline tool (106.3) may provide data output (135) to the surface unit (134).

FIG. 1.4 depicts a production operation being performed by a production tool (106.4) deployed from a production unit or Christmas tree (129) and into the completed wellbore (136) of FIG. 1.3 for drawing fluid from the downhole reservoirs (104) into surface facilities (142) via a gathering network (146). Sensors (S) positioned about the oilfield (100) are operatively connected to a surface unit (134) with a transceiver (137) for collecting data (135), for example, reservoir data, wellbore data, surface data and/or process data.

While one wellsite is shown, it will be appreciated that the oilfield (100) may cover a portion of land that hosts one or more wellsites. Part, or all, of the oilfield may be on land and/or sea. Also, the oilfield operations depicted in FIGS. 1.1-1.4 may be performed with any combination of one or more oilfields, one or more processing facilities and one or more wellsites.

FIGS. 2.1-2.4 are graphical depictions of data collected by the tools of FIGS. 1.1-1.4, respectively. FIG. 2.1 depicts a seismic trace (202) of the subterranean formation (102) of FIG. 1.1 taken by survey tool (106.1). FIG. 2.2 depicts a core sample (133) taken by the logging tool (106.2) of FIG. 1.2. FIG. 2.3 depicts a well log (204) of the subterranean formation (102) taken by the wireline tool (106.3) of FIG. 1.3. FIG. 2.4 depicts a production decline curve (206) of fluid flowing through the subterranean formation (102) taken by the production tool (106.4) of FIG. 1.4.

FIG. 3 is a schematic view, partially in cross section of an oilfield (300) having data acquisition tools (302.1), (302.2), (302.3), and (302.4) positioned at various locations along the oilfield for collecting data of a subterranean formation (304). The data acquisition tools (302.1-302.4) may be the same as data acquisition tools (106.1-106.4) of FIG. 1, respectively. As shown, the data acquisition tools (302.1-302.4) generate data plots or measurements (308.1-308.4), respectively.

Data plots (308.1-308.3) are examples of static data plots that may be generated by the data acquisition tools (302.1-302.4), respectively. Static data plot (308.1) is a seismic two-way response time and may be the same as the seismic trace (202) of FIG. 2.1. Static plot (308.2) is core sample data measured from a core sample of the formation (304), similar to the core sample (133) of FIG. 2.2. Static data plot (308.3) is a logging trace, similar to the well log (204) of FIG. 2.3. Data plot (308.4) is a dynamic data plot of the fluid flow rate over time, similar to the graph (206) of FIG. 2.4. Other data may also be collected, such as historical data, user inputs, economic information, other measurement data, and other parameters of interest.

The subterranean formation (304) has a plurality of geological structures (306.1-306.4). As shown, the formation has a sandstone layer (306.1), a limestone layer (306.2), a shale layer (306.3), and a sand layer (306.4). A fault line (307) extends through the formation. The static data acquisition tools are adapted to measure the formation and detect the characteristics of the geological structures of the formation.

While a specific subterranean formation (304) with specific geological structures are depicted, it will be appreciated that the formation may contain a variety of geological structures. Fluid may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more oilfields or other locations for comparison and/or analysis.

The data collected from various sources, such as the data acquisition tools of FIG. 3, may then be evaluated. Typically, seismic data displayed in the static data plot (308.1) from the data acquisition tool (302.1) is used by a geophysicist to determine characteristics of the subterranean formation (304). Core data shown in static plot (308.2) and/or log data from the well log (308.3) is typically used by a geologist to determine various characteristics of the geological structures of the subterranean formation (304). Production data from the production graph (308.4) is typically used by the reservoir engineer to determine fluid flow reservoir characteristics.

Figure 4:
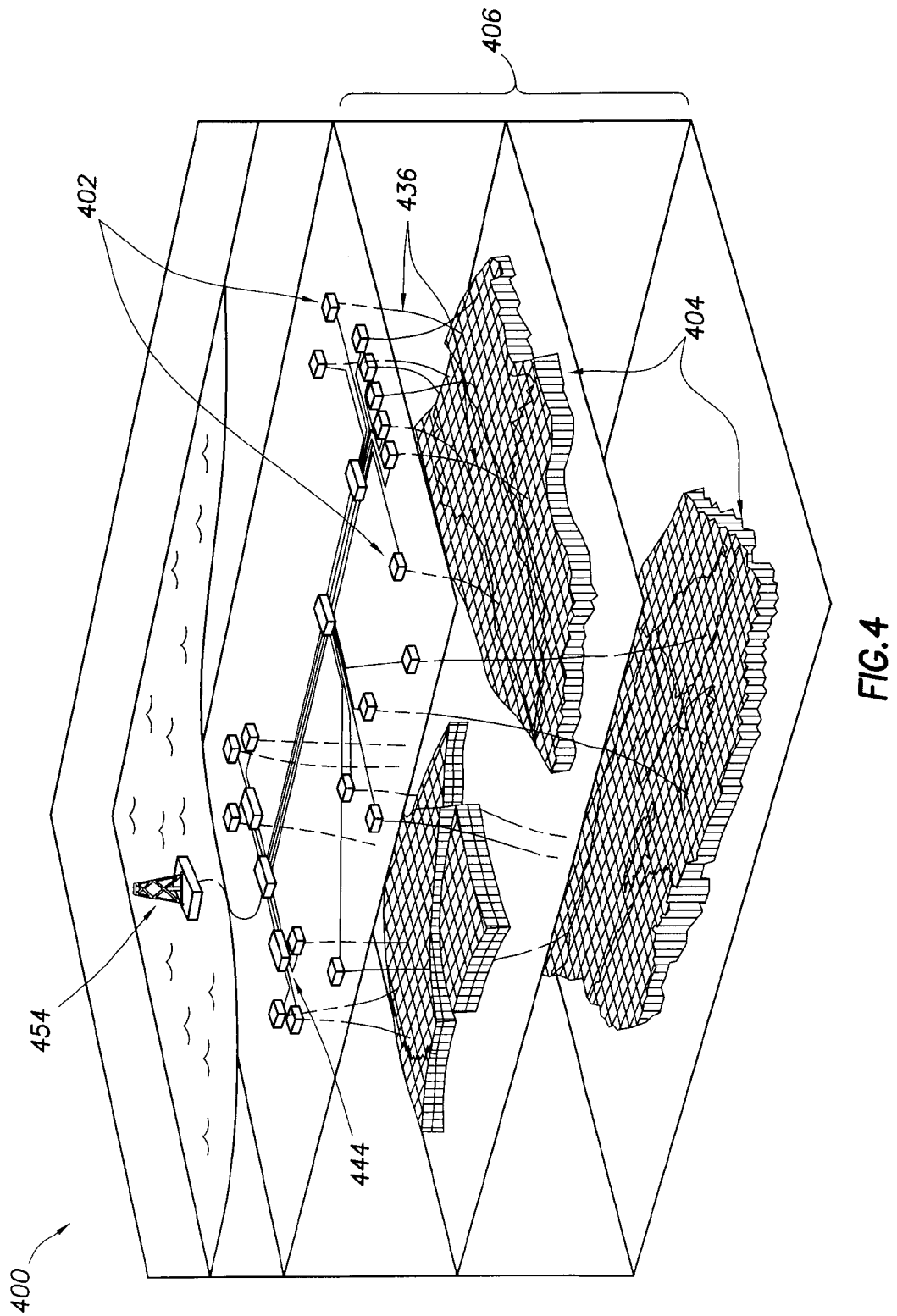
FIG. 4 shows an example schematic view of an oilfield having a plurality of wellsites for producing hydrocarbons from the subterranean formation.

FIG. 4 shows an oilfield (400) for performing production operations. As shown, the oilfield has a plurality of wellsites (402) operatively connected to a central processing facility (454). The oilfield configuration of FIG. 4 is not intended to limit the scope of the invention. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite (402) has equipment that forms a wellbore (436) into the earth. The wellbores extend through subterranean formations (406) including reservoirs (404). These reservoirs (404) contain fluids, such as hydrocarbons. The wellsites draw fluid from the reservoirs and pass them to the processing facilities via surface networks (444). The surface networks (444) have tubing and control mechanisms for controlling the flow of fluids from the wellsite to the processing facility (454).

Generally speaking, for an oil reservoir, capillary pressure typically exhibits four distinct characteristics upon saturation. For example, in terms of water saturation for a water-wet porous medium where drainage and imbibition denote decreasing and increasing water saturation, respectively, these characteristics are:

1) Primary drainage: occurs over a geological timescale when oil enters a porous medium previously saturated completely with water (e.g., water saturation equals 1), resulting in displacement of water and reduced water saturation resulting in the formation of an oil reservoir.

2) Secondary imbibition: typically occurs when water is injected into the reservoir to displace oil, resulting in increased water saturation.

3) Secondary drainage: typically occurs when gas is injected into the reservoir, often as part of a water-alternating-gas (WAG) improved oil recovery strategy. The injection operations (e.g., water injection and/or WAG improved oil recovery) may be the same as those described in reference to FIG. 1.4 above.

Primary imbibition: occurs when water displaces oil from a porous medium previously saturated completely with oil (e.g., water saturation equals 0). Primary imbibition and other characteristics of capillary pressure described above can be measured in the laboratory by performing experiments on core samples taken from the reservoir, such as the core samples described in reference to FIGS. 1.2 and 2.2 above.

For porous reservoir media, the nature of hysteresis remains phenomenological and implies the existence of hysteretic mesoscopic units (HMU). In this simplified phenomenological hysteresis model, a porous reservoir is represented by an assemblage of capillary elements that behave hysteretically as a function of the fluid saturation. A single HMU may exist in one of three states: imbibition, drainage, and intermediate scan states. The behavior of an HMU is such that the HMU is initially located on the drainage curve with drainage capillary pressure $p_c^d$, but moves to attain the imbibition capillary pressure $p_c^i$ by traversing a scanning curve as the saturation increases. Upon reaching the imbibition curve it remains on the curve as the saturation continues to increase. When the saturation starts to decrease, the element once again traverses a scanning curve, which can be different from an imbibition scanning curve, returning to its original drainage curve. A large number of HMU elements with differing ($p_c^d$, $p_c^i$) parameters provides a signature for a heterogeneous porous reservoir, which depends on the state of saturation and on the degree of damage to the material.

As described above, modeling a nonlinear hysteresis response of reservoir media may be used in Reservoir Simulation Modeling. In one or more embodiments, a region (e.g., a HMU) of the reservoir may be represented by one or more simulation grid blocks in the reservoir simulation model, where capillary pressure $p_c$ of each grid block may be calculated based on $p_c^d$ and $p_c^i$ of the region containing the grid block. Additional details related to modeling the characteristics of the capillary pressure are provided below.

Figure 5:
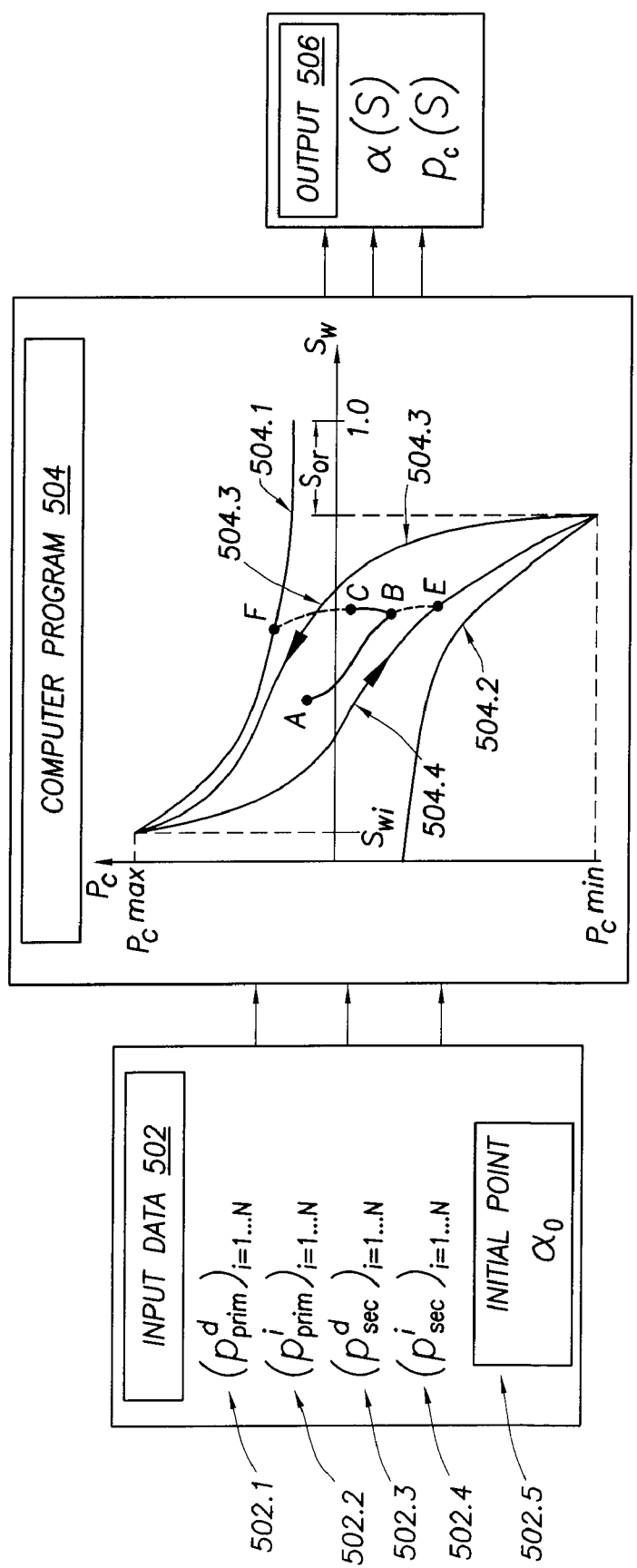
FIG. 5 shows an example schematic view of modeling a nonlinear hysteresis response of reservoir media in accordance with one or more embodiments.

FIG. 5 shows an example schematic view of modeling a nonlinear hysteresis response of reservoir media, which may be performed in an oilfield, such as the oilfield (300) depicted in FIG. 3 above. Specifically, FIG. 5 shows a schematic representation of the generalized algorithm for calculating capillary pressure characteristics as a function of water saturation in a reservoir of the oilfield (300). In one or more embodiments, the calculation may be based on a generalized phenomenological model to describe the hysteretic nonlinear response of capillary pressure and relative permeability. For example, the active hysteresis may be modeled by the solution of either a differential or an integral equation.

As shown in FIG. 5, computer program (504) receives input data (502) to generate output (506). In one or more embodiments, the computer program (504) is configured to model characteristics of a reservoir, for example, using an analytical model or a numerical method to solve the differential or integral equation describing the active hysteresis. Additional details related to the analytical model or numerical method used in modeling a nonlinear hysteresis response of reservoir media are provided below.

As shown in FIG. 5, the characteristics of the reservoir may include a relationship between the capillary pressure and fluid saturation. In one or more embodiments, the computer program (504) receives an initial value of the capillary pressure/fluid saturation (i.e., an initial state (502.5) $\alpha_0$) and generates the output (506) representing subsequent behavior of the capillary pressure as a function of fluid saturation (e.g., water saturation $S_w$) when the reservoir condition shifts from the initial state (502.5) $\alpha_0$; for example, in an injection operation. In the example shown in FIG. 5, the capillary pressure is denoted as $p_c$ along the vertical axis while the fluid saturation, specifically water saturation in this example, is denoted as $S_w$ along the horizontal axis. In addition, the primary drainage characteristics of the capillary pressure as a function of fluid saturation is shown as a primary drainage curve (504.1) starting from $S_w=1$ following decreasing water saturation to end at $S_w=S_{wi}$ where capillary pressure reaches a maximum $p_c^{max}$, the primary imbibition characteristics of the capillary pressure as a function of fluid saturation is shown as a primary imbibition curve (504.2) starting from $S_w=0$ following increasing water saturation to end at $S_w=S_{wi}-S_{or}$ where capillary pressure reaches a minimum $p_c^{min}$. The secondary drainage characteristics of the capillary pressure as a function of fluid saturation is shown as a secondary drainage curve (504.3) starting from $S_w=S_{wi}-S_{or}$ with capillary pressure at the minimum $p_c^{min}$ following decreasing water saturation to end at $S_w=S_{wi}$ with capillary pressure at the maximum $p_c^{max}$. The secondary imbibition characteristics of the capillary pressure as a function of fluid saturation is shown as a secondary imbibition curve (504.4) starting from $S_w=S_{wi}$ with capillary pressure at the maximum $p_c^{max}$ following increasing water saturation to end at $S_w=S_{wi}-S_{or}$ with capillary pressure at the minimum $p_c^{min}$. The arrows on the secondary drainage curve (504.3) and the secondary imbibition curve (504.4) indicate the direction of decreasing fluid saturation and increasing fluid saturation respectively.

In one or more embodiments, portions or all of the curves (504.1)-(504.4) may be preconfigured in the computer program (504). In one example, the preconfigured curves are based on a pre-defined analytical model and may not be user adjustable. In another example, the preconfigured curves may be user adjustable based on at least a portion of the input data (502.1)-(502.4). More details related to determining the preconfigured curves based on user input data are provided below.

Further as shown in FIG. 5, an initial state (e.g., initial values of the capillary pressure and fluid saturation) of a grid block in the reservoir model may be represented by point A, which corresponds to an initial value of a hysteretic function parameter $\alpha_0$ (502.5). Additional details related to the hysteretic function parameter are provided below. In a water or WAG injection operation, the state of the grid block may change in time from point A as the capillary pressure and fluid saturation change due to the injection operations. For example, the state of the grid block may traverse a curve from point A toward point E on the secondary imbibition curve (504.4). Based on the specific injection schedule, the state of the grid block may reach a reversal point B and change course to traverse another curve from point B toward point F on the primary drainage curve (504.1). These curves traversed by the state of the grid block as the reservoir condition changes are referred to as scanning curves. At any point of time, the state of the grid block may be in an intermediate scan state (e.g., points A, B, and C) when it is not on any of the primary or secondary drainage/imbibition curves (504.1)-(504.4).

In one or more embodiments, constitutive equations may be used to model the characteristics of the capillary pressure described above. A constitutive equation is a relation between two physical quantities that is specific to a material or substance and approximates the response of that material to external forces. Some constitutive equations are phenomenological while others are derived from first principles (i.e., basic assumptions). A common constitutive equation is expressed as a simple proportionality using a parameter taken to be a property of the material. One such example of a constitutive equation is Hooke's law. The constitutive equation may be combined with other equations governing physical laws (e.g., Darcy's law, various conservation laws, etc.) to solve physical problems.

In one or more embodiments, the constitutive equations for capillary pressure when bounded between the primary drainage ($p_c^d$) and imbibition ($p_c^i$) curves can be written as:

$$p_c = (1-\alpha)p_c^d + \alpha p_c^i, \alpha \in [0,1] \quad (1)$$

$$\frac{d\alpha}{dS} = \eta(\alpha)[\mathrm{sgn}(\dot{S})(\chi(S,\dot{S}) - \alpha) + \gamma(S,\dot{S})], \alpha \in [0,1] \quad (2)$$

where $\alpha$ is the hysteretic function parameter, S is the fluid saturation, sgn( ) is the sign function, and $\dot{S}=dS/dt$ is the rate of the fluid saturation. Further, $\alpha$, $p_c$, $p_c^d$, and $p_c^i$ are functions of S but are abbreviated for clarity while $\chi(S,\dot{S})$, $\gamma(S,\dot{S})$ and $\eta(\alpha)$ are material functions that may be specified based on material properties to model phenomenological behaviors of the reservoir. The primary drainage ($p^d_c$) and imbibition ($p^i_c$) curves are referred to as bounding curves for the region represented by equation (1).

In one or more embodiments, the computer program (504) is configured to use constitutive equations (e.g., (1) and (2)) to model the secondary drainage/imbibition curves and the scanning curves of the reservoir. In one or more embodiments, the material functions $\chi(S,\dot{S})$, $\gamma(S,\dot{S})$, $\eta(\alpha)$ and the parameters used in the model may be fine-tuned to match different experimental data or can be used as history matching parameters.

In one or more embodiments, the material functions may be specified as below:

$$\eta(\alpha) = \begin{cases} \alpha \psi_0, & \text{if } \frac{dS}{dt} < 0 - \text{drainage,} \\ (1-\alpha)\psi_0, & \text{if } \frac{dS}{dt} > 0 - \text{imbibition} \end{cases} \quad (3)$$

$$\chi(S, \dot{S}) = \begin{cases} \chi_1(S), & \text{if } \frac{dS}{dt} < 0 \\ \chi_2(S), & \text{if } \frac{dS}{dt} > 0 \end{cases}, \gamma(S, \dot{S}) = \begin{cases} \gamma_1(S), & \text{if } \frac{dS}{dt} < 0 \\ \gamma_2(S), & \text{if } \frac{dS}{dt} > 0 \end{cases} \quad (4)$$

where $\psi_0$ is a material specific constant (e.g., 0.25).

Equations (1-4) describe the subsequent transition between imbibition and drainage curves. Material functions may be specified such that the hysteresis models obey the symmetry restriction with respect to the transformation $(1-\alpha) \to \alpha$. For these types of hysteresis models, the following equality restriction is obtained:

$$\chi_2(S) + \chi_1(S) = 1 + \gamma_1(S) - \gamma_2(S) \quad (5)$$

In one or more embodiments, the material function may be further specified as $\gamma_1(S) = K\gamma_2(S)$; therefore, equation (4) can be rewritten as:

$$\chi_2(S) + \chi_1(S) = 1 + (K-1)\gamma_2(S), \gamma_1(S) = K\gamma_2(S) \quad (6)$$

Finally, the equations (1-4) and (6) form the set of constitutive equations for modeling a nonlinear hysteresis response of reservoir media. The set of constitutive equations are based on predefined bounding curves, for example the primary drainage ($p^d_c$) and imbibition ($p^i_c$) curves measured from core samples. In one or more embodiments, the computer program (504) is configured to generate the output (506) using these constitutive equations (1-4), (6) and the associated predefined bounding curves.

In one or more embodiments, the differential equation (2) for the case when $\dot{S} \neq 0$ can be solved analytically and the model expressed in terms of the bounding and scanning curves.

In one embodiment, the material functions $$\chi(S, \dot{S}) = H\left(-\frac{dS}{dt}\right)$$

(where H(•) is the Heaviside step function) and $\gamma(S,\dot{S}) \equiv 0$ are considered:

$$\frac{d\alpha}{dS} = \begin{cases} (1-\alpha)^2 \psi_0, & \frac{dS}{dt} > 0 \\ \alpha^2 \psi_0, & \frac{dS}{dt} < 0 \end{cases}, S \in [S_f^{min}, S_f^{max}] \quad (7)$$

where $S_f^{min}$ is the minimum fluid saturation and $S_f^{max}$ is the maximum fluid saturation.

The differential equation (7) with the defined initial data can be solved analytically. For the case when $\dot{S} > 0$, the analytical solution has the form:

$$\alpha(S) = \frac{\left(\frac{1}{S - S_f^1 - E} - \frac{1}{E}\right)}{\left(\frac{1}{S_f^2 - S_f^1 - E} - \frac{1}{E}\right)}, \text{ where } \alpha(S_1) = 0, \alpha(S_2) = 1 \quad (8)$$

and $$E = \frac{1}{\psi_0}$$

is the curvature parameter.

In another embodiment, the material functions are specified by $\chi(S,\dot{S}) \equiv \frac{1}{2}$ and $\gamma(S,\dot{S}) \equiv 0$ providing a trivial solution to equation (5) and equation (2) takes the form:

$$\frac{d\alpha}{dS} = \begin{cases} (1-\alpha)\left(\frac{1}{2} - \alpha\right)\psi_0, & \frac{dS}{dt} > 0 \\ -\alpha\left(\frac{1}{2} - \alpha\right)\psi_0, & \frac{dS}{dt} < 0 \end{cases}, S_w \in [S_{wi}, S_{wmax}] \quad (9)$$

It should be noted that equation (9) is valid for $$\alpha \in \left[0, \frac{1}{2}\right],$$

which does not satisfy the condition that $\alpha \in [0,1]$.

In yet another embodiment, the material functions $\chi(S,\dot{S})$, $\gamma(S,\dot{S})$ are defined as:

$$\chi(S, \dot{S}) = \begin{cases} \frac{K}{2}, & \text{if } \frac{dS}{dt} < 0 \\ \frac{K}{2}, & \text{if } \frac{dS}{dt} > 0 \end{cases}, \gamma(S, \dot{S}) = \begin{cases} K_1, & \text{if } \frac{dS}{dt} < 0 \\ K_2, & \text{if } \frac{dS}{dt} > 0 \end{cases} \quad (10)$$

where $K_1 = K$ and $K_2 = 1$ are assumed. The final exponential hysteresis model takes the form:

$$\frac{d\alpha}{dS} = \begin{cases} (1-\alpha)\left(\frac{K+2}{2} - \alpha\right)\psi_0, & \frac{dS}{dt} > 0 \\ \alpha\left(\alpha + \frac{K}{2}\right)\psi_0, & \frac{dS}{dt} < 0 \end{cases}, S_w \in [S_{wi}, S_{wmax}] \quad (11)$$

where K>0 is the exponential hysteresis parameter and $\alpha \in [0,1]$. The resulting differential equation (11) with the defined initial data can be solved analytically, for example, for $\dot{S} > 0$:

$$\alpha(S) = \frac{\frac{K+2}{2}\exp\left(\frac{K}{2}\left[\frac{S}{E} - \frac{S_f^1}{E} - \frac{2}{K}\ln\left(\frac{K+2}{2}\right)\right]\right) - 1}{\exp\left(\frac{K}{2}\left[\frac{S}{E} - \frac{S_f^1}{E} - \frac{2}{K}\ln\left(\frac{K+2}{2}\right)\right]\right) - 1}, \quad (12)$$

where $\alpha(S_f^1) = 0$ and $$E = \frac{1}{\psi_0}$$

is the effective curvature. Equations (1) and (12) constitute the exponential hysteresis model.

In still another embodiment, or the trigonometric hysteresis model, the material functions $\chi(S,\dot{S})$ and $\gamma(S,\dot{S})$ are considered as follows:

$$\chi(S, \dot{S}) = \begin{cases} K\sin^2(2\pi S), & \text{if } \frac{dS}{dt} < 0 \\ K\cos^2(2\pi S), & \text{if } \frac{dS}{dt} > 0, \end{cases} \quad (13)$$

$$\gamma(S, \dot{S}) = \begin{cases} K_1, & \text{if } \frac{dS}{dt} < 0 \\ K_2, & \text{if } \frac{dS}{dt} > 0 \end{cases}$$

where $K_1 = K$ and $K_2 = 1$ are assumed. In this case, equation (5) is satisfied due to the fundamental trigonometric equality:

$$\chi_2(S) + \chi_1(S) = K\cos^2(2\pi S) + K\sin^2(2\pi S) \equiv K \quad (14)$$

Therefore, equation (2) takes the form:

$$\frac{d\alpha}{dS} = \begin{cases} (1-\alpha)(\cos^2(2\pi S) + 1 - \alpha)\psi_0, & \frac{dS}{dt} > 0 \\ \alpha(K + \alpha - \sin^2(2\pi S))\psi_0, & \frac{dS}{dt} < 0, \end{cases} \quad (15)$$

$$S_w \in [S_{wi}, S_{wmax}]$$

where $K > 0$ is the exponential hysteresis parameter and $\alpha \in [0, 1]$. The resulting differential equation (15) with the defined initial data can be solved analytically, for example, for $\dot{S} < 0$, resulting in a differential equation in Bernoulli's form:

$$\frac{d\alpha}{dS} = \psi_0 \alpha^2 + \alpha(K - \sin^2(2\pi S))\psi_0, \, S_w \in [S_{wi}, S_{wmax}], \quad (16)$$

which can be solved analytically by Bernoulli's substitution $$\frac{1}{\alpha} = v:$$

$$\frac{1}{\alpha} = C(S)\exp(-\omega(S)), \quad (17)$$

$$\omega(S) = \psi_0\left(K + \frac{1}{2}\right)S - \frac{1}{8\pi}\psi_0\sin(4\pi S)$$

$$C(S) = -\psi_0 \int \exp(-\omega(S))dS + C_1,$$

Although certain examples described above apply to the case where $\dot{S} > 0$, one skilled in the art will appreciate that the differential equations for the case where $\dot{S} < 0$ may be solved in similar manner and vice versa.

The constitutive equations (1-4) and (6) provide a general mathematical formulation for the hysteresis model. Based on specific material properties of the reservoir being modeled, the user may select one of the analytical models described above that produces output (506) sufficiently consistent with actual measured data.

The analytical solution described above is efficient for computing resources and performance; however, in practice, some form of user control over the nature of the hysteresis may be useful. The differential form of the equations (1-4) and (6) allows a smooth transition, as observed in experimental data, for both relative permeability and capillary pressure from drainage-to-imbibition and imbibition-to-drainage states and requires minimum storage of parameters during the simulation and, thus, is suitable for incorporation into a numerical model. An appropriate choice of material functions may be based on tabular data obtained from laboratory measurements, for example of core samples described in reference to FIGS. 1.2 and 2.2 above.

In one or more embodiments, the computer program (504) may be configured to determined the bounding curves and material functions of the constitutive equations under user control, for example, based on the following experimental data as input data (502) from the user: $(S_f)_{i=1 \ldots N}$, $(p_{prim}^d)_{i=1 \ldots N}$, $(p_{prim}^i)_{i=1 \ldots N}$, $(p_{sec}^d)_{i=1 \ldots N}$, and $(p_{sec}^i)_{i=1 \ldots N}$, where $(S_f)_{i=1 \ldots N}$ is the experimental data for fluid saturations, $(p_{prim}^d)_{i=1 \ldots N}$ is the experimental primary drainage curve, $(p_{prim}^i)_{i=1 \ldots N}$ is the experimental primary imbibition curve, $(p_{sec}^d)_{i=1, \ldots, N}$ is the experimental secondary drainage curve, $(p_{sec}^i)_{i=1 \ldots N}$ is the experimental secondary imbibition curve and N is the number of experimental points as depicted in FIG. 5.

In one or more embodiments, the computer program (504) may be configured to determine the bounding curves based on $(S_f)_{i=1 \ldots N}$, $(p_{prim}^d)_{i=1 \ldots N}$, and $(p_{prim}^i)_{i=1 \ldots N}$, for example, using interpolation or intrapolation techniques known in the art.

In one or more embodiments, the computer program (504) may be configured to determine the material functions using a numerical method to achieve sufficient consistency between the modeled results versus the measured results, $(S_f)_{i=1 \ldots N}$, $(p_{sec}^d)_{i=1, \ldots, N}$, and $(p_{sec}^i)_{i=1 \ldots N}$. Additional details related to the numerical method are provided below.

Applying the second order central difference scheme, the following approximation of derivatives $(d\alpha/dS_f)$ can be obtained:

$$\left(\frac{d\alpha}{dS_f}\right)_i^{dm} = \frac{\alpha_{i+1} - \alpha_{i-1}}{(S_f)_{i+1} - (S_f)_{i-1}}, i = 1 \ldots N \quad (18)$$

-Secondary drainage curve;

$$\left(\frac{d\alpha}{dS_f}\right)_i^{imb} = \frac{\alpha_{i+1} - \alpha_{i-1}}{(S_f)_{i+1} - (S_f)_{i-1}}, i = 1 \ldots N; \quad (19)$$

-Secondary imbibition curve;

Applying constitutive equations (2-4) for the secondary drainage and imbibition curves and equation (13) for the material function $\gamma(S,\dot{S})$, the following system of equations can be written:

$$\chi_1(S_f^i) = \alpha_i - \frac{1}{\alpha_i \psi_0} \left( \frac{d\alpha}{dS_f} \right)_i^{drn} + K_1, \quad (20)$$

-Drainage scanning curve;

$$\chi_2(S_f^i) = \alpha_i + \frac{1}{(1-\alpha_i)\psi_0} \left( \frac{d\alpha}{dS_f} \right)_i^{imb} - K_2, \quad (21)$$

-Imbibition scanning curve;

where $K_1$ and $K_2$ are user defined constants. This algorithm can be numerically implemented and generates capillary-pressure scanning curves with provisions for hysteresis loops from any reversal point.

Although specific examples are described in the embodiments above, one skilled in the art will appreciate that the computer program (504) is not constrained to the use of only drainage and imbibition curves, which are assumed to form a closed loop hysteresis.

Figure 6:
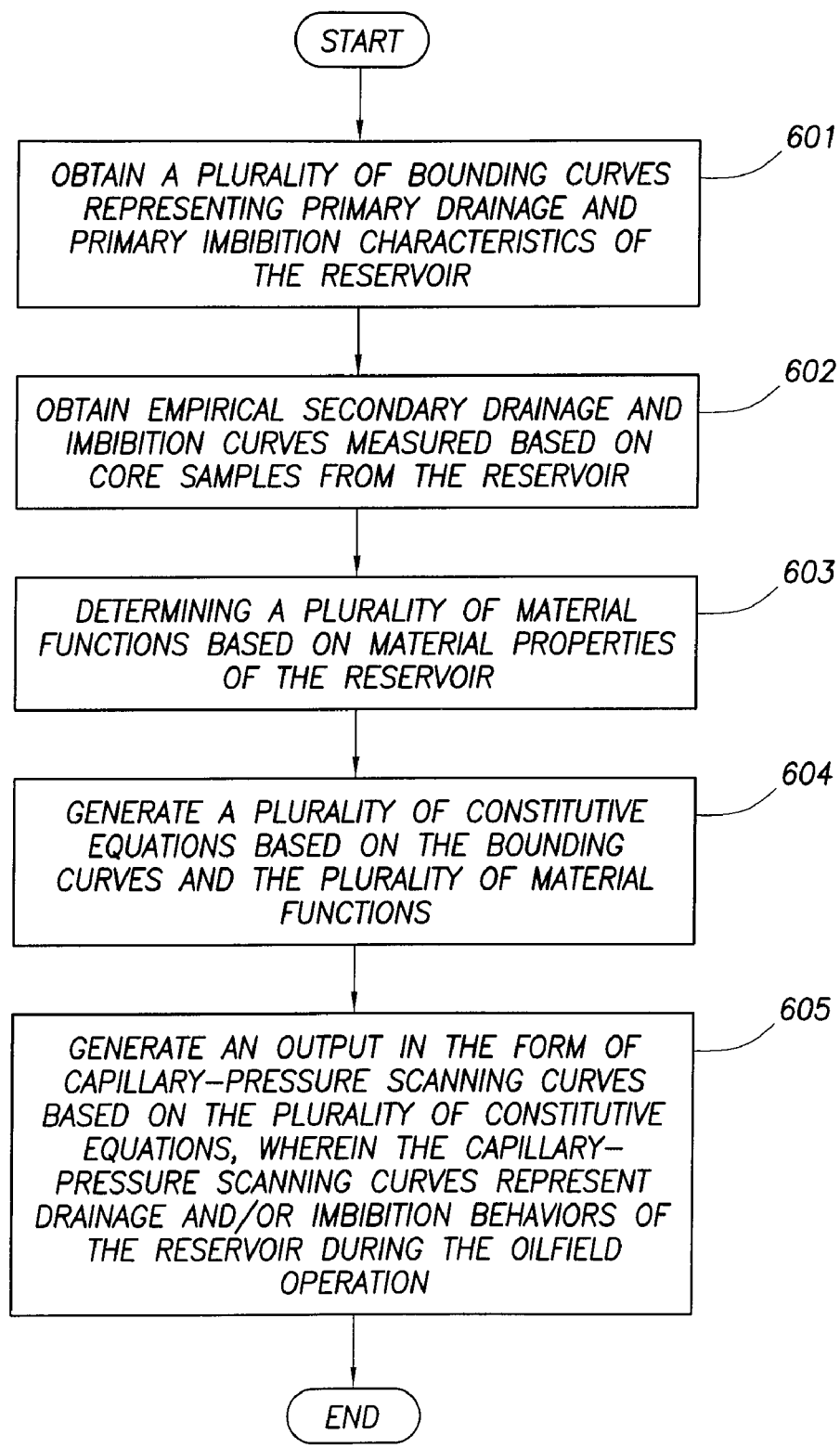
FIG. 6 is a flow chart of a method for modeling a nonlinear hysteresis response of reservoir media in accordance with one or more embodiments.

FIG. 6 is a flow chart of a method for modeling a nonlinear hysteresis response of reservoir media in accordance with one or more embodiments. In one or more embodiments, one or more of the elements shown in FIG. 6 may be omitted, repeated, and/or performed in a different order. Accordingly, embodiments of modeling a nonlinear hysteresis response of reservoir media should not be considered limited to the specific arrangements of elements shown in FIG. 6.

In one or more embodiments, the method depicted in FIG. 6 may be practiced based on the schematic view described with respect to FIG. 5 above. Initially, bounding curves representing primary drainage and primary imbibition characteristics of the reservoir may be obtained (Element 601). As described above, the primary drainage and primary imbibition characteristics may include hysteresis characteristics. In one or more embodiments, the bounding curves may include the primary drainage curve and the primary imbibition curve as described with respect to FIG. 5 above, which may be measured based on cores samples from the reservoir. For example, the measurements may be represented as $(S_f)_{i=1 \ldots N}$, $(p_{prim}^d)_{i=1 \ldots N}$, and $(p_{prim}^i)_{i=1 \ldots N}$.

In Element 602, empirical secondary drainage and imbibition curves may be measured based on core samples from the reservoir. For example, the measurements may be represented as $(S_f)_{i=1 \ldots N}$, $(p_{sec}^d)_{i=1, \ldots, N}$, and $(p_{sec}^i)_{i=1 \ldots N}$ described above.

In Element 603, material functions (e.g., equations (3)-(6)) may be determined based on material properties of the reservoir. In one or more embodiments, the material functions may be pre-determined (e.g., equations (7), (10), or (13)) for multiple specific reservoir types, where the user may select appropriate material functions for use in the reservoir simulation modeling based on the type of reservoir being modeled. In one or more embodiments, the material functions may be determined using a numerical method by matching numerically generated secondary drainage and imbibition curves (e.g., equations (18) and (19)) to the empirical secondary drainage and imbibition curves (e.g., as measured in Element 602 above).

In Element 604, constitutive equations (e.g., equations (1), (2)) may be generated based on the bounding curves and the material functions. In one or more embodiments, the constitutive equations may be solved analytically (e.g., equations (8), (9), (12), or (17)). In one or more embodiments, the constitutive equations may be solved using a numerical method (e.g., equations (20), (21)).

In Element 605, an output in the form of capillary-pressure scanning curves may be generated based on the plurality of constitutive equations. For example the capillary-pressure scanning curves may be represented by equations (8), (9), (12), (17), (20), or (21). As described with respect to FIG. 5 above, the capillary-pressure scanning curves represent drainage and/or imbibition behaviors of the reservoir during the oilfield operation. For example, a scanning curve may start from an initial state of the reservoir condition at the onset of an injection operation and represent the traversal of the reservoir condition as the injection operation continues according to the injection schedule or strategy. Optionally for the analytical solution, the adequacy of the selected material functions may be confirmed by comparing the secondary drainage and imbibition curves derived from the analytical model to the empirical secondary drainage and imbibition curves (e.g., as measured in Element 602 above).

Figure 7:
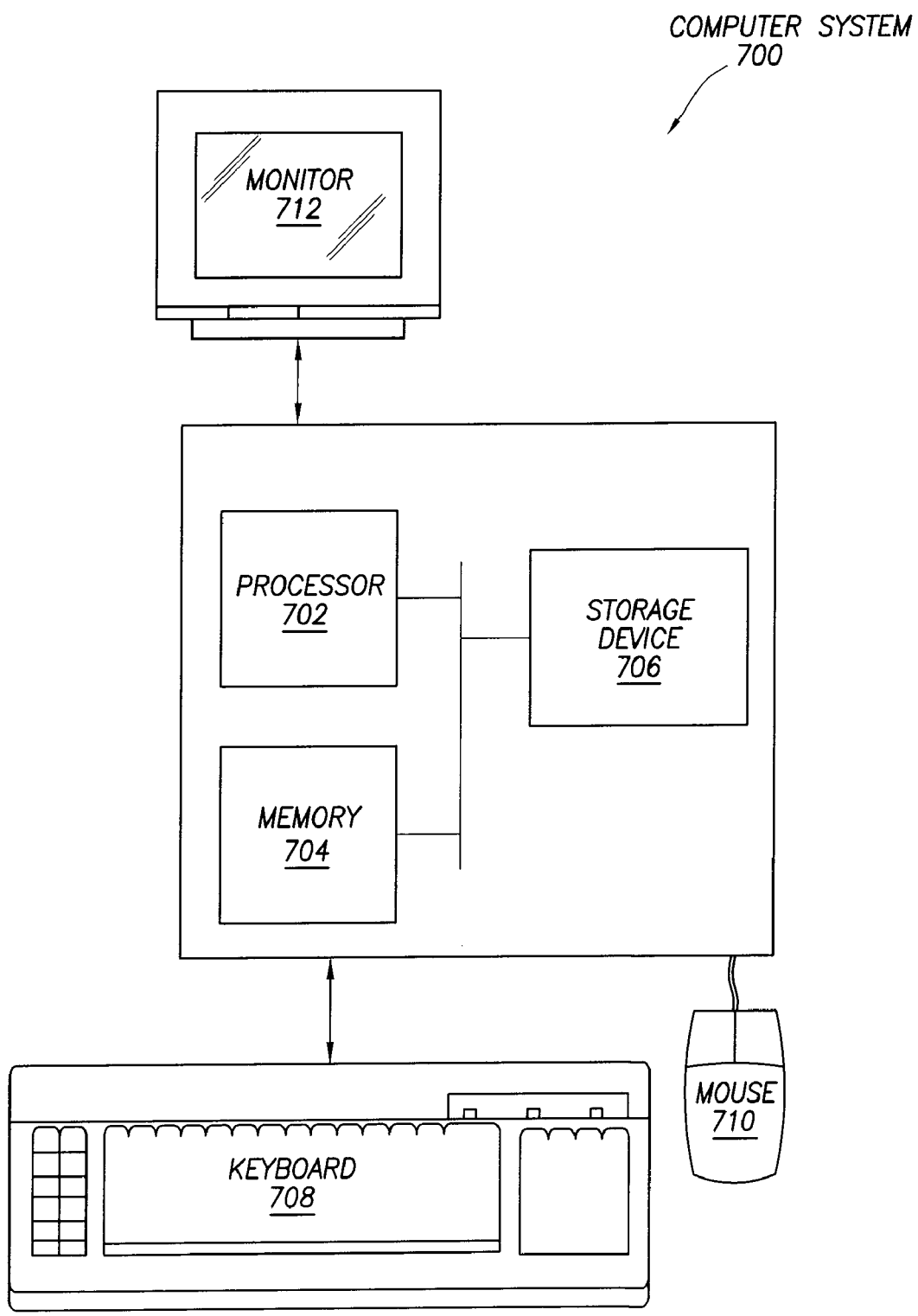
FIG. 7 depicts a computer system in accordance with one or more embodiments of modeling a nonlinear hysteresis response of reservoir media.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

One or more of the embodiments of modeling a nonlinear hysteresis response of reservoir media may include one or more of the following. One or more of the embodiments may provide a more consistent mathematical background to existing empirical solutions of the hysteresis behavior observed on variables, such as the capillary pressure. The mathematical framework used in one or more of the embodiments may allow for a better analysis of the hysteresis behavior, and potentially lead to more original solutions based on an appropriate choice of the materials functions in the model. Further, in one or more of the embodiments, the mathematical framework models the hysteresis in relative permeabilities. In one or more of the embodiments, a correct modeling of capillary pressure and relative permeability hysteresis is utilized in the assessment of the quality of a reservoir simulator and, as a consequence, in the quality of reservoir production management. In one or more of the embodiments, the proposed model allows a smooth transition of both relative permeability and capillary pressure from drainage-to-imbibition or imbibition-to-drainage states and requires minimal storage of parameters during the simulation. One skilled in the art will appreciate that the characteristics described above are not exhaustive and the embodiments should not be limited by those provided.

It will be understood from the foregoing description that various modifications and changes may be made in the embodiments of modeling a nonlinear hysteresis response of reservoir media without departing from its true spirit. For example, the simulators couplings and arrangement of the system may be selected to achieve the desired simulation. The simulations may be repeated according to the various configurations, and the results compared and/or analyzed.

This description is intended for purposes of illustration and should not be construed in a limiting sense. The scope of this invention should be determined by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of modeling a nonlinear hysteresis response of reservoir media comprising:
   obtaining measurements of core samples from the reservoir to generate a plurality of bounding curves representing primary drainage and primary imbibition characteristics of a reservoir;
   generating, using a processor, a plurality of constitutive equations based on the plurality of bounding curves and a plurality of material functions, the plurality of material functions determined based on material properties associated with the reservoir, and wherein the plurality of constitutive equations comprises:

$p_c = (1-\alpha)p_c^d + \alpha p_c^i, \alpha \in [0,1]$, $d\alpha/dS = \eta(\alpha)[\mathrm{sgn}(\dot{S})(\chi(S,\dot{S})-\alpha) + \gamma(S,\dot{S})], \alpha \in [0,1]$ where $p_c$ is capillary pressure, $p_c^d$ is a primary drainage curve, $p_c^i$ is a primary imbibition curve, $\alpha$ is a hysteretic function parameter, S is fluid saturation, sgn( ) is sign function, $\dot{S}=dS/dt$ is a rate of the fluid saturation, and $\chi(S,\dot{S})$, $\gamma(S,\dot{S})$ and $\eta(\alpha)$ are at least a portion of the plurality of material functions;
   generating, using the processor, an output in a form of capillary-pressure scanning curves based on the plurality of constitutive equations, the capillary-pressure scanning curves representing drainage and imbibition behaviors of the reservoir during an oilfield operation; and
   storing the output.

2. The method of claim 1, wherein the capillary-pressure scanning curves are generated using an analytical solution of the plurality of constitutive equations.

3. The method of claim 2, further comprising:
   identifying the material functions based on characteristics of the reservoir.

4. The method of claim 1, wherein the capillary-pressure scanning curves are generated using a numerical solution of the plurality of constitutive equations, wherein the material functions are determined by matching numerically generated secondary drainage and imbibition curves to empirical secondary drainage and imbibition curves measured from core samples from the reservoir.

5. The method of claim 1, wherein the plurality of material functions comprises:

$$\eta(\alpha) = \begin{cases} \alpha\psi_0, & \text{if } \frac{dS}{dt} < 0 \text{ -drainage,} \\ (1-\alpha)\psi_0, & \text{if } \frac{dS}{dt} > 0 \text{ -imbibition} \end{cases}$$

$$\chi(S,\dot{S}) = \begin{cases} \chi_1(S), & \text{if } \frac{dS}{dt} < 0 \\ \chi_2(S), & \text{if } \frac{dS}{dt} > 0, \end{cases}, \gamma(S,\dot{S}) = \begin{cases} \gamma_1(S), & \text{if } \frac{dS}{dt} < 0 \\ \gamma_2(S), & \text{if } \frac{dS}{dt} > 0 \end{cases}$$

where $\psi_0$ is a material specific constant and t represents time.

6. The method of claim 5, wherein the plurality of material functions further comprises:

$\chi_2(S)+\chi_1(S) \equiv 1+(K-1)\gamma_2(S), \gamma_1(S)=K\gamma_2(S)$, where K is a constant.

7. A non-transitory computer readable medium for modeling a nonlinear hysteresis response of reservoir media, the computer readable medium storing instructions when executed by the processor comprising functionality for:
   obtaining a plurality of bounding curves representing primary drainage and primary imbibition characteristics of a reservoir;
   generating, using a processor, a plurality of constitutive equations based on the plurality of bounding curves and a plurality of material functions, the plurality of material functions determined based on material properties associated with the reservoir, wherein the plurality of constitutive equations comprise:

$p_c = (1-\alpha)p_c^d + \alpha p_c^i, \alpha \in [0,1]$, $\frac{d\alpha}{dS} = \eta(\alpha)[\mathrm{sgn}(\dot{S})(\chi(S,\dot{S})-\alpha) + \gamma(S,\dot{S})], \alpha \in [0,1]$ where $p_c$ is capillary pressure, $p_c^d$ is a primary drainage curve, $p_c^i$ is a primary imbibition curve, $\alpha$ is a hysteretic function parameter, S is fluid saturation, sgn( ) is sign function, $\dot{S}=dS/dt$ is a rate of the fluid saturation, and $\chi(S,\dot{S})$, $\gamma(S,\dot{S})$ and $\eta(\alpha)$ are at least a portion of the plurality of material functions;
   obtaining, using the processor, an analytical solution of the plurality of constitutive equations as capillary-pressure scanning curves, the capillary-pressure scanning curves representing drainage and imbibition behaviors of the reservoir during an oilfield operation; and
   storing the output.

8. The computer readable medium of claim 7, wherein the plurality of bounding curves are generated based on measurements of core samples from the reservoir.

9. The computer readable medium of claim 7, wherein the material functions are pre-determined based on characteristics of the reservoir.

10. The computer readable medium of claim 7, wherein the capillary-pressure scanning curves are generated using a numerical solution of the plurality of constitutive equations, wherein the material functions are determined by matching numerically generated secondary drainage and imbibition curves to empirical secondary drainage and imbibition curves measured from core samples from the reservoir.

11. The computer readable medium of claim 7, wherein the plurality of material functions comprises:

$$\eta(\alpha) = \begin{cases} \alpha\psi_0, & \text{if } \frac{dS}{dt} < 0 \text{ - drainage,} \\ (1-\alpha)\psi_0, & \text{if } \frac{dS}{dt} > 0 \text{ - imbibition} \end{cases}$$

$$\chi(S, \dot{S}) = \begin{cases} \chi_1(S), & \text{if } \frac{dS}{dt} < 0 \\ \chi_2(S), & \text{if } \frac{dS}{dt} > 0, \end{cases}, \gamma(S, \dot{S}) = \begin{cases} \gamma_1(S), & \text{if } \frac{dS}{dt} < 0 \\ \gamma_2(S), & \text{if } \frac{dS}{dt} > 0 \end{cases}$$

where $\psi_0$ is a material specific constant and t represents time.

12. The computer readable medium of claim 11, wherein the plurality of material functions further comprises:

$\chi_2(S)+\chi_1(S) \equiv 1+(K-1)\gamma_2(S), \gamma_1(S)=K\gamma_2(S)$, where $K$ is a constant.

13. A computer system for modeling a nonlinear hysteresis response of reservoir media, the system comprising:
a processor,
memory storing instructions when executed by the processor comprising functionality for:
obtaining a plurality of bounding curves representing primary drainage and primary imbibition characteristics of a reservoir;
generating a plurality of constitutive equations based on the plurality of bounding curves and a plurality of material functions, the plurality of material functions determined based on material properties associated with the reservoir, wherein the plurality of constitutive equations comprises:

$p_c = (1-\alpha)p_c^d + \alpha p_c^i, \alpha \in [0, 1],$ $\frac{d\alpha}{dS} = \eta(\alpha)[\text{sgn}(\dot{S})(\chi(S,\dot{S})-\alpha) + \gamma(S,\dot{S})], \alpha \in [0, 1]$ where $p_c$ is capillary pressure, $p_c^d$ is a primary drainage curve, $p_c^i$ is a primary imbibition curve, $\alpha$ is a hysteretic function parameter, S is fluid saturation, sgn( ) is sign function, $\dot{S}=dS/dt$ is a rate of the fluid saturation, and $\chi(S,\dot{S})$, $\gamma(S,\dot{S})$ and $\eta(\alpha)$ are at least a portion of the plurality of material functions;
obtaining a numerical solution of the plurality of constitutive equations as capillary-pressure scanning curves, the capillary-pressure scanning curves representing drainage and imbibition behaviors of the reservoir during an oilfield operation; and
displaying the output.

14. The system of claim 13, wherein the material functions are pre-determined based on characteristics of the reservoir.

15. The system of claim 13, wherein the material functions are determined by matching numerically generated secondary drainage and imbibition curves to empirical secondary drainage and imbibition curves measured from core samples from the reservoir.

16. The system of claim 13, wherein the plurality of material functions comprises:

$$\eta(\alpha) = \begin{cases} \alpha\psi_0, & \text{if } \frac{dS}{dt} < 0 \text{ - drainage,} \\ (1-\alpha)\psi_0, & \text{if } \frac{dS}{dt} > 0 \text{ - imbibition} \end{cases}$$

$$\chi(S, \dot{S}) = \begin{cases} \chi_1(S), & \text{if } \frac{dS}{dt} < 0 \\ \chi_2(S), & \text{if } \frac{dS}{dt} > 0, \end{cases}, \gamma(S, \dot{S}) = \begin{cases} \gamma_1(S), & \text{if } \frac{dS}{dt} < 0 \\ \gamma_2(S), & \text{if } \frac{dS}{dt} > 0 \end{cases}$$

where $\psi_0$ is a material specific constant and t represents time.

17. The system of claim 16, wherein the plurality of material functions further comprises:

$\chi_2(S)+\chi_1(S) \equiv 1+(K-1)\gamma_2(S), \gamma_1(S)=K\gamma_2(S)$, where $K$ is a constant.

* * * * *